US007155908B2

(12) United States Patent
Jeon

(10) Patent No.: US 7,155,908 B2
(45) Date of Patent: Jan. 2, 2007

(54) HYDRAULIC SYSTEM FOR HEAVY EQUIPMENT OPTION APPARATUS

(75) Inventor: Man Suk Jeon, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 85 days.

(21) Appl. No.: 10/460,321

(22) Filed: Jun. 12, 2003

(65) Prior Publication Data

US 2004/0154294 A1 Aug. 12, 2004

(30) Foreign Application Priority Data

Feb. 12, 2003 (KR) ...................... 10-2003-0008841

(51) Int. Cl.
*F16D 31/02* (2006.01)

(52) U.S. Cl. ........................................................ 60/429

(58) Field of Classification Search .................. 60/428, 60/413, 414, 421, 429

See application file for complete search history.

(56) References Cited

U.S. PATENT DOCUMENTS 4,210,061 A * 7/1980 Bianchetta .................... 60/484
5,083,428 A * 1/1992 Kubomoto et al. ........... 60/428
6,148,548 A * 11/2000 Tohji ........................... 60/429
6,330,797 B1 * 12/2001 Kondo ........................ 60/421
6,430,922 B1 * 8/2002 Tohji ........................... 60/421

FOREIGN PATENT DOCUMENTS

JP 8199632 8/1996
JP 2002 206256 7/2002

OTHER PUBLICATIONS

English Abstract of JP 2002 206256 dated Jul. 26, 2002.
English Abstract of JP 8199632 dated Aug. 6, 1996.

* cited by examiner

*Primary Examiner*—F. Daniel Lopez
(74) *Attorney, Agent, or Firm*—Ladas and Parry LLP

(57) ABSTRACT

The present invention is directed to controlling an operation oil supplied to an option apparatus without changing a design of a control valve assembly which controls an operation oil supplied to a traveling motor, etc. when additionally engaging an option apparatus to a small size excavator. In a hydraulic system for a heavy equipment which includes a plurality of hydraulic pumps, a main control valve which is switched by a pilot signal pressure and controls an operation oil supplied to a left and right side traveling motor and a work apparatus, and a pilot pump which supplies a pilot signal pressure to the main control valve, there is provided a hydraulic system for a heavy equipment option apparatus which includes a straight traveling control valve which combines an operation from a plurality of the hydraulic pumps and supplies to the left and right side traveling motors and disconnects an operation supplied to the traveling motor when the same is switched by a pilot signal pressure, and an option apparatus control valve which is switched concurrently with the straight traveling control valve by a pilot signal pressure and controls an operation oil supplied from one side hydraulic pump to an additional option apparatus.

2 Claims, 4 Drawing Sheets

– Prior Art –

HYDRAULIC SYSTEM FOR HEAVY EQUIPMENT OPTION APPARATUS

BACKGROUND OF THE INVENTION

1. Field of the Invention

The present invention relates to a hydraulic system for a heavy equipment option which is capable of implementing a certain work by switching an option apparatus using a conventional straight traveling control valve when an option apparatus (referred to a braker) is additionally engaged to a small size excavator, and in particular to a hydraulic system for a heavy equipment option which is capable of controlling an operation oil which is supplied to an option apparatus by a switching apparatus switched together with a straight traveling control valve in a state that a design of a control valve assembly which controls an operation oil supplied to a traveling motor or a work apparatus in the case that an option apparatus is additionally engaged to a small size excavator of a crawler type.

2. Description of the Background Art

As shown in FIG. 1, a conventional hydraulic system of a heavy equipment includes a first control valve C1 which is switched by a pilot signal pressure Pi from a pilot pump(not shown) and controls an operation oil supplied from a first hydraulic pump P1 to a right side traveling motor(not shown) or a work apparatus, a second control valve C2 which is switched by a pilot signal pressure Pi and controls an operation oil from a second hydraulic pump P2 to a work apparatus(not shown), a third control valve C3 which is switched by a pilot signal pressure Pi and controls an operation oil from a third hydraulic pump P3 to a left traveling motor or a work apparatus, and a straight traveling control valve C4 which is switched by a straight traveling pilot signal pressure and combines the operation oils from the second and third hydraulic pumps P2 and P3 and straight-travels an equipment.

At this time, an operation oil from the first hydraulic pump p1 is drained to a hydraulic tank T1, and an operation oil from the second and third hydraulic pumps P2 and P3 is drained to the hydraulic tank T2 or T3.

However, in the case that an operation is implemented by an operation oil from the third hydraulic pump P3 by additionally engaging an option apparatus to a small excavator to which a conventional hydraulic system is adapted, since an additional switching apparatus capable of supplying an operation oil to an additional option apparatus is attached to a front or rear portion of the straight traveling control valve C4 or a design of a control valve structure should be changed, a size of a corresponding part is increased, and a work process is added, so that a fabrication cost is increased.

In addition, in order to engage a control valve assembly having a large outer size to a small size excavator, a substantial space is required, and a workability that a large size control valve assembly is engaged to a small space of a small size excavator is decreased.

SUMMARY OF THE INVENTION

Accordingly, it is an object of the present invention to provide a hydraulic system for a heavy equipment option apparatus which is capable of implementing a small and compact size control valve assembly and decreasing a unit cost and a fabrication cost in such a manner that an operation oil is supplied to an option apparatus without changing a structure of a control valve assembly in the case that an option apparatus is additionally engaged to a small size excavator of a crawler type.

It is another object of the present invention to provide a hydraulic system for a heavy equipment option apparatus which is capable of easily installing a small size control valve to a small size excavator and enhancing a workability and implementing an efficiency of an equipment by maximizing a function of a small size equipment.

To achieve the above objects, in a hydraulic system for a heavy equipment which includes a plurality of hydraulic pumps, a main control valve which is switched by a pilot signal pressure and controls an operation oil supplied to a left and right side traveling motor and a work apparatus, and a pilot pump which supplies a pilot signal pressure to the main control valve, there is provided a hydraulic system for a heavy equipment option apparatus which includes a straight traveling control valve which combines an operation from a plurality of the hydraulic pumps and supplies to the left and right side traveling motors and disconnects an operation supplied to the traveling motor when the same is switched by a pilot signal pressure, and an option apparatus control valve which is switched concurrently with the straight traveling control valve by a pilot signal pressure and controls an operation oil supplied from one side hydraulic pump to an additional option apparatus.

In addition, in the present invention, a heavy equipment to which an option apparatus is additionally engaged is a crawler type excavator.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiment of the present invention will be described in detail with reference to the accompanying drawings.

Figure 1:
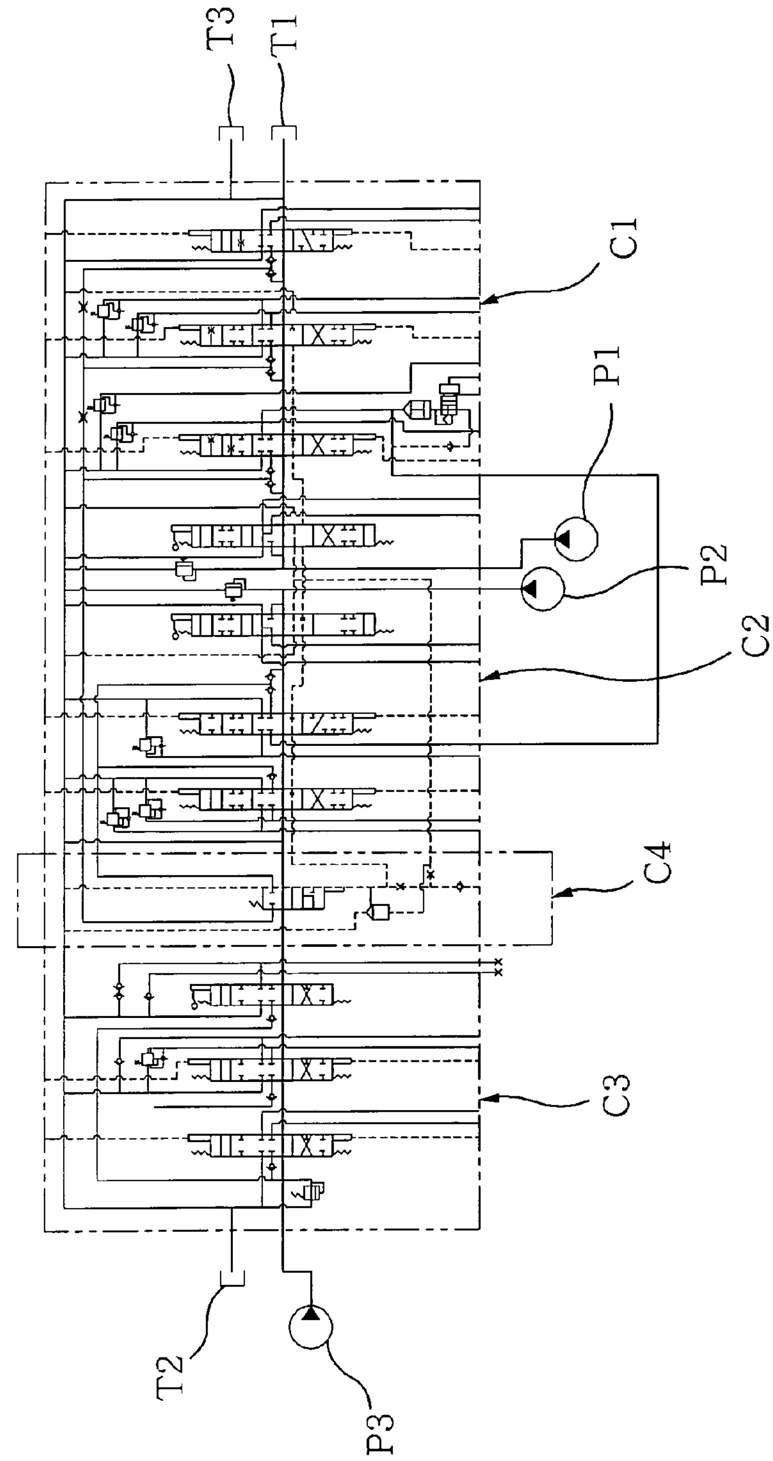
FIG. 1 is a view illustrating a hydraulic circuit of a conventional heavy equipment hydraulic system.
Figure 2:
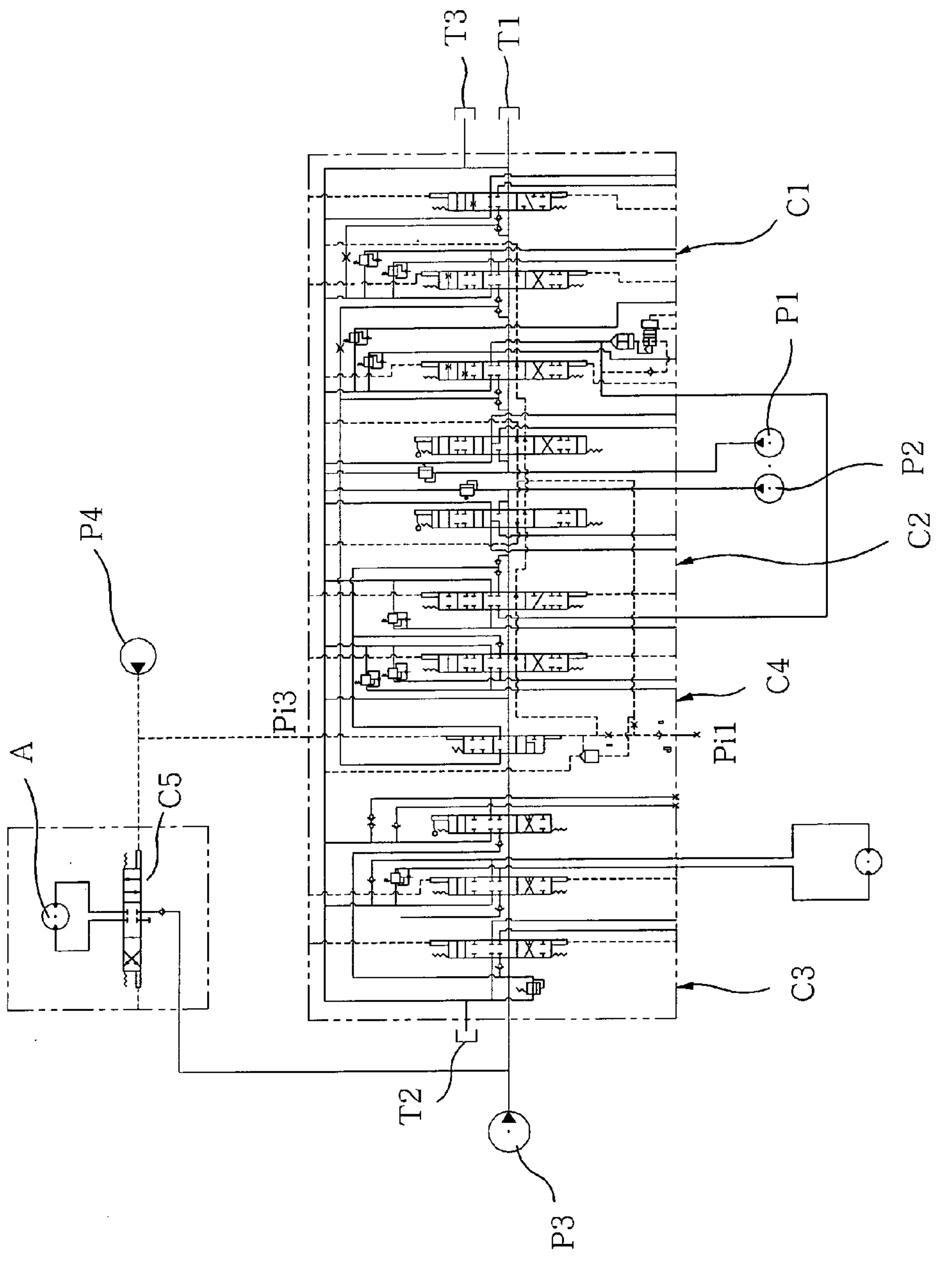
FIG. 2 is a view illustrating a hydraulic circuit of a hydraulic system for a heavy equipment option apparatus according to the present invention.
Figure 3:
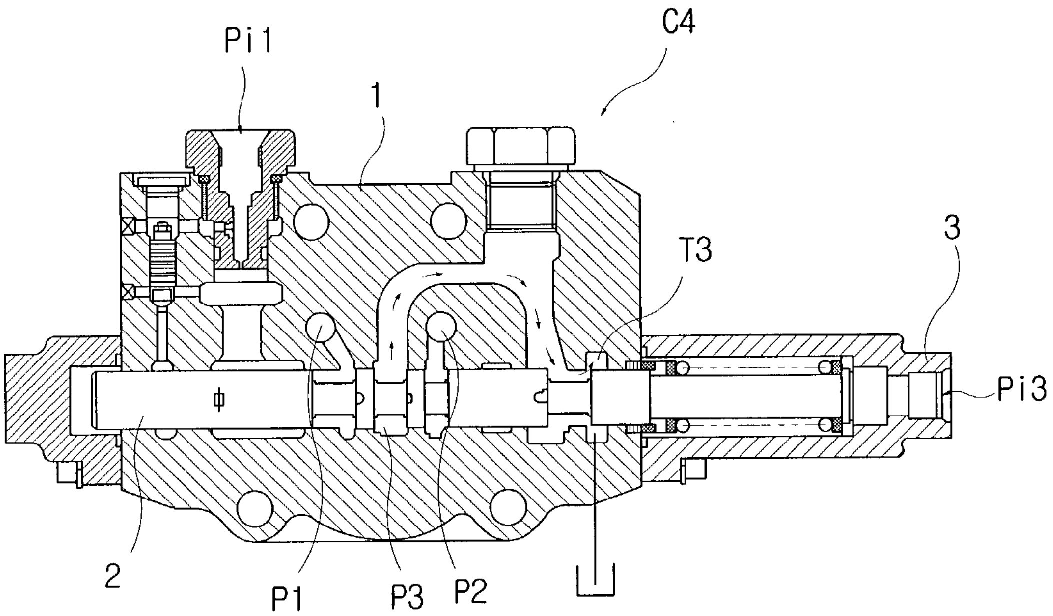
FIG. 3 is a cross sectional view illustrating a mechanical construction at an intermediate mode of a straight traveling control valve in a hydraulic system for a heavy equipment option apparatus according to the present invention.
Figure 4:
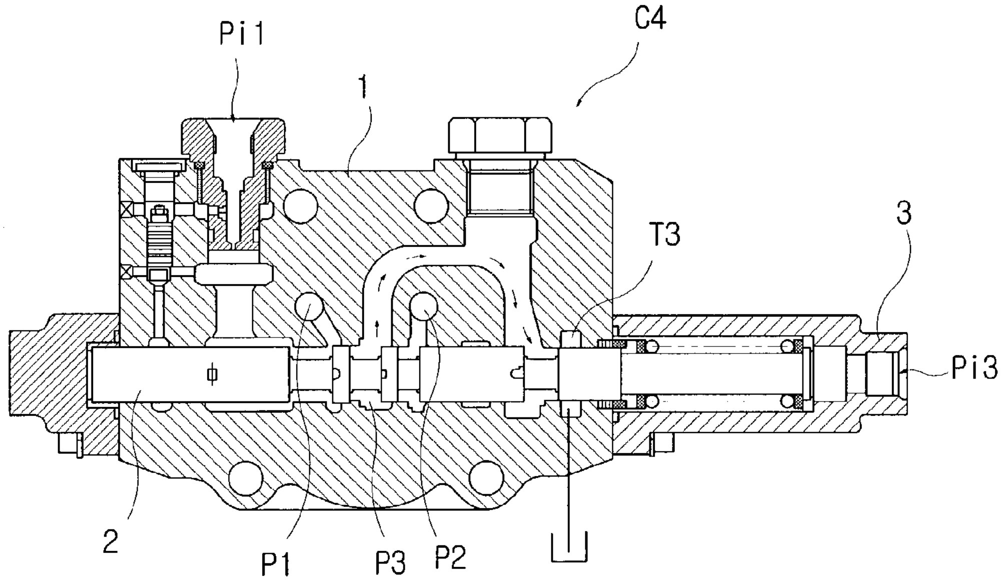
FIG. 4 is a cross sectional view illustrating a mechanical construction when a straight traveling control valve is in a switching mode in a hydraulic system form a heavy equipment option apparatus according to the present invention.

As shown in FIGS. 2 through 4, the present invention is adapted to a heavy equipment hydraulic system which includes a plurality of hydraulic pumps P1, P2 and P3, a plurality of control valves C1, C2 and C3 which are switched by a pilot signal pressure Pi and supply an operation oil from the hydraulic pumps P1, P2 and P3 to a left and right side traveling motor or work apparatus, and a pilot pump (not shown) which supplies a switching pilot signal pressure to the main control valves C1, C2 and C3. Since the above construction is the same as FIG. 1, the detailed construction and operation will be omitted.

Therefore, a hydraulic system for a heavy equipment option apparatus according to the present invention includes a straight traveling control valve C4 which combines an operation oil from the hydraulic pumps P2 and P3 when it is switched by a supply of a pilot signal pressure Pi1, supplies to a left and right side traveling motor (not shown) for thereby straight-traveling an equipment and disconnects an operation oil which is supplied from one side hydraulic pump P3 to a traveling motor when it is switched by a pilot signal pressure Pi3 from the pilot pump P4, and an option apparatus control valve C5 which is switched concurrently with the straight traveling control valve C4 by a pilot signal pressure Pi3 supplied to the straight traveling control valve C4 for thereby supplying an operation oil from the hydraulic pump P3 to an additional option apparatus A.

In the drawings, reference numeral 1 represents a housing of the option apparatus control valve C5, 2 represents a spool which is slidably installed in the housing 1 and controls an operation oil from the hydraulic pump P3 to the traveling motor or the option apparatus A, and 3 represents a spool cap.

The operation of the hydraulic system for a heavy equipment hydraulic system according to the present invention will be described in detail.

As shown in FIGS. 2 and 3, since the inner spool 2 of the straight traveling control valve C4 is in the intermediate mode, an operation oil from the hydraulic pump P3 is drained to the hydraulic tank T3 or T1 (moved in the direction of the arrow).

As shown in FIGS. 2 and 4, in the case that an option apparatus A is additionally engaged to the heavy equipment, as a pilot signal pressure Pi3 from the pilot pump P4 is supplied to the option apparatus control valve C5, the pilot signal pressure Pi3 is supplied from an upper side to a lower side as shown in FIG. 2, and as shown in FIG. 4, the same is supplied to a port of the spool cap 3. Since the spool 2 is switched in the left direction as shown in FIG. 4, a flowing path of the operation oil drained from the hydraulic pump p3 to the hydraulic tank T3 is disconnected.

At this time, since an operation oil from the hydraulic pump P3 to the traveling motor is disconnected, a straight traveling function is temporarily stopped.

At the same time, a pilot signal pressure Pi3 from the pilot pump P4 is supplied to the option apparatus control valve C5, and the same is switched in a left or right direction of FIG. 2, so that it is possible to rotate the option apparatus A in a left direction or a right direction.

As described above, in the case that an option apparatus A such as a braker is engaged to a small size excavator, an operation oil supplied to the option apparatus A is controlled using a conventional straight traveling control valve in a state that a structure of a main control valve which forms a hydraulic system adapted to an equipment is not changed. Therefore, it is possible to decrease a unit cost and a fabrication cost.

As shown in FIG. 2, an operation oil from the hydraulic pumps P2 and P3 are combined and supplied to a traveling motor in such a manner that a pilot signal pressure Pi1 is supplied to a lower side of the straight traveling control valve C4, and an inner spool is switched in an upward direction, so that it is possible to implement an equipment inherent straight traveling function.

At this time, since a pilot signal pressure Piu3 is not supplied to the option apparatus control valve C5, the operation apparatus control valve C5 is switched to an intermediate mode (shown in FIG. 2), so that a supply of the operation oil from the hydraulic pump P3 to the option apparatus A is disconnected.

The hydraulic system for a heavy equipment option apparatus according to the present invention has the following advantages.

In the case that an option apparatus is additionally engaged to a small size excavator, it is possible to an operation oil to an additionally engaged option apparatus by changing a structure of a conventional straight traveling valve structure without changing a structure of a control valve assembly, so that it is possible to implement a small size and compact control valve assembly for thereby decreasing a unit cost and fabrication cost.

In addition, a small volume control valve assembly is easily engaged to a small size excavator for thereby enhancing a workability, and an inherent characteristic of a small size equipment is maintained. Therefore, it is possible to maximize a function of an equipment in a narrow work place.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a hydraulic system for a heavy equipment with option apparatus, the hydraulic system including a plurality of hydraulic pumps a first control valve (C1) for controlling an operation oil supplied from a first hydraulic pump (P1) to a right side traveling motor and a second control valve (C2) for controlling an operation oil from a second hydraulic pump (P2), and a pilot pump which supplies a pilot signal pressure to the control valves respectively, the improvements comprising:

a straight traveling control valve (C4) which controls operation oil supplies from a third hydraulic pump (P3) by a pilot signal pressure (Pi3), and disconnects the operation oil supply of the third hydraulic pump (P3) by another pilot signal pressure (Pi1), and an inner spool having a flowing path communicated with the first, second and third hydraulic pump (P1, P2 and P3); and an option apparatus control valve (C5) which is switched concurrently with the straight traveling control valve (C4) by the pilot signal pressure (Pi3) and controls an operation oil supplied from the third hydraulic pump P3 to the option apparatus.

2. The system of claim 1, wherein the heavy equipment to which the option apparatus is additionally engaged is a crawler type excavator.

* * * * *